(No Model.)  A. G. CHRISTMAN.  3 Sheets—Sheet 1.
PLOW.

No. 293,309.  Patented Feb. 12, 1884.

Attest:
Blaster Fowler
H. B. Applewhaite

Inventor:
Augustus G. Christman
by Thomas P. Kinsey
Atty.

(No Model.) 3 Sheets—Sheet 2.

A. G. CHRISTMAN.
PLOW.

No. 293,309. Patented Feb. 12, 1884.

Attest;
S. Walter Fowler
H. B. Applewhaite

Inventor;
Augustus G. Christman
by Thomas P. Kinsey
Atty (No Model.)  
3 Sheets—Sheet 3.

A. G. CHRISTMAN.
PLOW.

No. 293,309.  
Patented Feb. 12, 1884.

Attest:  
D. Walter Fowler,  
Geo. M. Fisher.

Inventor:  
Augustus G. Christman,  
by Thomas P. Kinsey  
Atty.

United States Patent Office.

AUGUSTUS G. CHRISTMAN, OF LITIZ, PENNSYLVANIA.

PLOW.

SPECIFICATION forming part of Letters Patent No. 293,309, dated February 12, 1884.

Application filed May 12, 1883. (No model.)

*To all whom it may concern:*

Be it known that I, AUGUSTUS G. CHRISTMAN, a citizen of the United States, residing at Litiz, county of Lancaster, and State of Pennsylvania, have invented a new and useful Improvement in Plows, of which the following is a specification.

This improvement relates more particularly to my double-standard-plow patents, No. 254,543, of March 7, 1882, and No. 275,354, of April 10, 1883, and is the outcome of practical experience therewith.

The object of the improvement is to reduce the cost of the plow, to furnish at the same time one that may be cheaply renewed in its wearing parts, and, while retaining the efficiency of the plow, to reduce the number of pieces constituting the same. I attain the above results by the construction shown in the accompanying drawings, which form a part of the specification, and in which corresponding parts are designated with corresponding letters.

Figure 1:
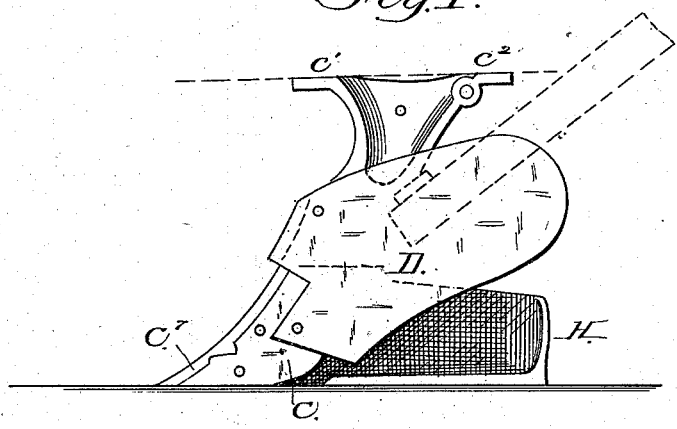
Figure 2:
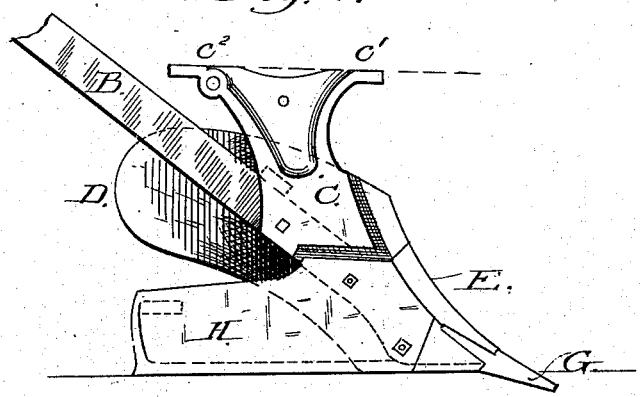
Figure 3:
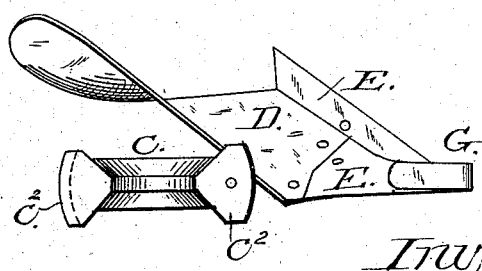
Figure 4:
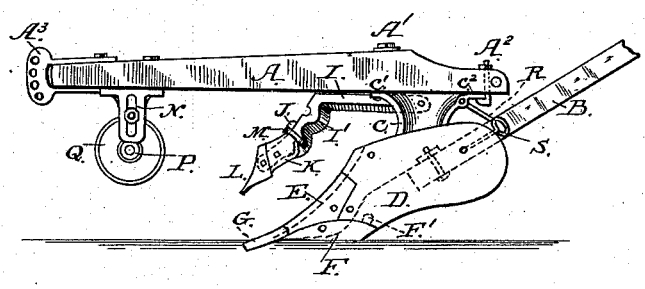
Figure 5:
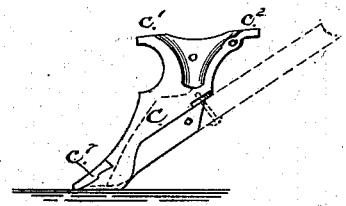
Figure 7:
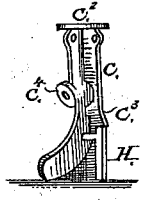
Figure 6:
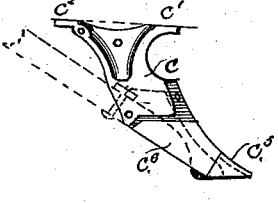
Figure 8:
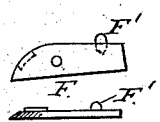
Figure 9:
Figure 10:
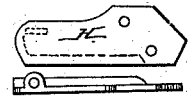
Figure 11:
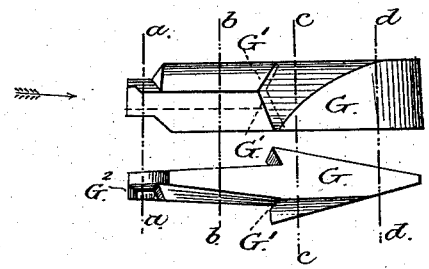
Figure 12:
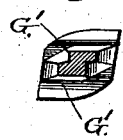
Figure 13:
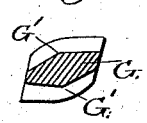
Figure 14:
Figure 15:
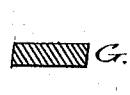
Figure 16:
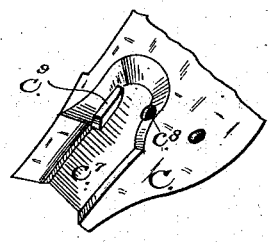
Figure 18:
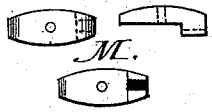
Figure 17:
Figure 17:
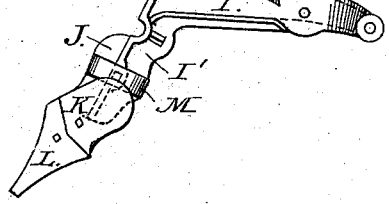
Figure 19:
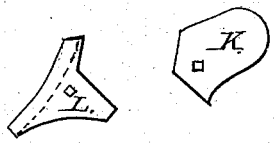

Figure 1, Sheet 1, is an elevation of the plow divested of beam, cutter, and point on the mold-board side; Fig. 2, Sheet 1, an elevation of the landside of the plow with cutter and reversible point in place; Fig. 3, Sheet 1, a plan of the plow; Fig. 4, Sheet 2, an elevation of the complete plow on the mold-board side; Fig. 5, Sheet 2, mold-board-side elevation of the double standard; Fig. 6, Sheet 2, land-side elevation of the double standard; Fig. 7, Sheet 2, rear elevation of the standard; Fig. 8, Sheet 2, plan and edge view of the share-wing; Fig. 9, Sheet 2, plan and edge view of the cutter; Fig. 10, Sheet 2, plan and edge view of the landside; Fig. 11, Sheet 2, plan and edge view of the reversible point; Figs. 12, 13, 14, and 15, Sheet 3, sections of the reversible points at $a\ a$, $b\ b$, $c\ c$, and $d\ d$, respectively; Fig. 16, Sheet 3, perspective view of the reversible-point seat in the nose of the double standard; Fig. 17, Sheet 3, plan and elevation of the jointer complete; Fig. 18, Sheet 3, plan and side elevation of the friction-buttons securing the standard to jointer; Fig. 19, Sheet 3, elevation of the cutter and mold-board of jointer.

A represents the plow-beam; A', the fulcrum-bolt; $A^2$, the locking-bolt; $A^3$, the clevis; B, handles; C, double standard; C', front or fulcrum standard; $C^2$, rear or locking standard; $C^3$, pad for landside-handle; $C^4$, ear for mold-board handle; $C^5$, raised surface flush with landside; $C^6$, recess for reception of landside; $C^7$, recess for reception of point; $C^8$, bolt for forcing point into its seat in the standard; D, the mold-board; E, mold-board cutter; F, mold-board share-wing; F', lip on the same; G, plow-point, reversible and self-sharpening; G', undercut portion to lap onto the share-wing, cutter, and under face of standard; $G^2$, stop to prevent the withdrawal of the point; H, the landside; I, jointer-arm; I', jointer-head; J, mold-board and cutter standard; K, mold-board; L, cutter; M, friction-buttons; N, the pedestal for the caster-wheel; P, wheel-axis slide; Q, the wheel; R, braces from the beam to the plow; S, braces from the handles to the plow.

In construction the plow has been considerably modified, the number of pieces reduced, a better form given thereto, and facility of renewal thereby insured, the several parts most exposed to wear strengthened, and an independent reversible point introduced. The drawings have been so detailed that an expert will catch the points without a lengthy description, it being sufficient to say that the point is provided with a seat, $C^7$, in the nose of the double standard, which has an undercut lug, $C^9$, opposite the bolt-hole $C^8$. The lug $G^2$ of the point G is placed in contact with the lug $C^9$, and the bolt $C^8$, with its bevel-head, being screwed down, forces the point over against the lug, and the point, being also beveled to correspond with the lug, is thereby bound underneath the same, and as long as the bolt remains screwed up it cannot be released from the plow. The undercut portions G' lap over the cutter, share-wing, and the under portion of the standard, and is held rigidly as long as the bolt $C^8$ is undisturbed.

The cutter E and the share-wing F, which receive the principal wear of the plow in use, are made small, relatively, and adjustable, and are cheaply renewed. The landside H is not carried to the extreme front of the standard, a recess being provided for it in the same, and the standard thus receives the main thrust of the work.

In my present arrangement of double standard I dispense with the shoe—an essential part of my patent of March 7, 1882—very materially reducing the cost of construction, and by making the double standard independent of the mold-board increased facility is given to the construction of the molds in the foundry, and more certainty as to the result of castings made therein.

In my patent of April 10, 1883, the jointer-standard forms the cutter, and the mold-board is bolted to the same, whereas in my present arrangement I have the standard independent, being formed with palms, to which the cutter L and mold-board K are secured, thus gaining independent renewal of either piece.

Having shown the construction of my plow, its adaptation for renewal of parts, &c., I desire to secure by Letters Patent the following claims thereon:

1. In a plow, the combination, with the beam A and handles B, of an independent double and rearwardly-bifurcated standard, C, of the form shown, provided with beam-seats $C'$ $C^2$, pad $C^3$, and ear $C^4$ for handles, landside-face $C^5$, recess-seat for landside $C^6$, nose-recess $C^7$, for reversible point G, and clamping-bolt $C^8$ and lug $C^9$, and in combination therewith the mold-board D, cutter E, share-wing F, reversible point G, and landside H, substantially as shown, and for the purpose set forth.

2. In combination with a double standard for a plow, as described, a reversible point, G, provided with a taper stem, and of varying section, as shown, a lug, $G^2$, and undercut portion $G'$, adapted to combine with lug $C^9$ of recess $C^7$, and by bolt $C^8$ to be removably connected therewith, and by under-cut $G'$ to lock both cutter E and share-wing F at their forward ends, as and for the purpose specified.

AUGUSTUS G. CHRISTMAN.

Witnesses:
HAYDN H. TSHUDY,
H. C. HULL.